(12) United States Patent
Zeh

(10) Patent No.: US 12,222,299 B2
(45) Date of Patent: Feb. 11, 2025

(54) METHOD FOR ASSESSING CONTRASTS ON SURFACES

(71) Applicant: 4Art Holding AG, Steinhausen (CH)

(72) Inventor: Kai Zeh, Munich (DE)

(73) Assignee: 4Art Holding AG, Steinhausen (CH)

( * ) Notice: Subject to any disclaimer, the term of this patent is extended or adjusted under 35 U.S.C. 154(b) by 183 days.

(21) Appl. No.: 17/913,497

(22) PCT Filed: Mar. 3, 2021

(86) PCT No.: PCT/IB2021/051752
§ 371 (c)(1),
(2) Date: Sep. 22, 2022

(87) PCT Pub. No.: WO2021/191707
PCT Pub. Date: Sep. 30, 2021

(65) Prior Publication Data
US 2023/0147881 A1 May 11, 2023

(30) Foreign Application Priority Data

Mar. 23, 2020 (CH) ................... 00343/20

(51) Int. Cl.
*G01N 21/956* (2006.01)
*G06V 10/74* (2022.01)
*H04N 23/67* (2023.01)

(52) U.S. Cl.
CPC ..... *G01N 21/95607* (2013.01); *G06V 10/761* (2022.01); *H04N 23/675* (2023.01)

(58) Field of Classification Search
CPC ...... G06V 10/761; G06V 10/10; G06V 20/80; G01N 21/95607; H04N 23/675;
(Continued)

(56) References Cited

U.S. PATENT DOCUMENTS 4,924,086 A 5/1990 Weber
5,673,338 A 9/1997 Denenberg
(Continued)

FOREIGN PATENT DOCUMENTS

CN 104866837 B 8/2015
CN 105740820 B 7/2016
(Continued)

OTHER PUBLICATIONS

International Search Report and Written Opinion issued for PCT/IB2021/051752, dated May 7, 2021.
(Continued)

*Primary Examiner* — Hung V Nguyen
(74) *Attorney, Agent, or Firm* — Fleit Intellectual Property Law; Paul D. Blanco; Stephen Bongini

(57) ABSTRACT

A method for assessing contrasts on surfaces, in particular for optically identifying structured and/or pictorial surfaces, e.g. of paintings or sculptures, is simple to use independently of the location and safe. For this purpose, the method involves the steps of: focusing a camera onto a prominent image dot on the surface; creating at least two images of a recognizable, high-contrast area of the image dot; and storing the image having the greatest depth of detail as a reference image.

11 Claims, 2 Drawing Sheets

(58) Field of Classification Search
CPC ........ G07D 7/2033; G07D 7/206; G06T 7/00; G06T 2207/10004
See application file for complete search history.

(56) References Cited

U.S. PATENT DOCUMENTS

| | | | |
|---|---|---|---|
| 7,531,349 B1 | 5/2009 | Shepard et al. | |
| 10,194,091 B2* | 1/2019 | Nashizawa | H04N 23/741 |
| 10,891,485 B2* | 1/2021 | Anorga | G06V 30/413 |
| 10,990,845 B2 | 4/2021 | Boutant | |
| 11,099,134 B2 | 8/2021 | Prapenka | |
| 2003/0160182 A1 | 8/2003 | Petrich et al. | |
| 2004/0080661 A1* | 4/2004 | Afsenius | H04N 23/671 |
| | | | 348/E5.045 |
| 2004/0124359 A1 | 7/2004 | Hamrelius | |
| 2005/0207943 A1 | 9/2005 | Puzey | |
| 2008/0266549 A1 | 10/2008 | Schiedemeyer et al. | |
| 2009/0101842 A1 | 4/2009 | Shepard | |
| 2010/0140476 A1 | 6/2010 | Werner et al. | |
| 2011/0102577 A1 | 5/2011 | Prakapenka | |
| 2016/0178528 A1 | 6/2016 | Weimer et al. | |
| 2017/0038301 A1 | 2/2017 | Flanagan | |
| 2018/0059015 A1 | 3/2018 | Li et al. | |
| 2018/0350052 A1* | 12/2018 | Julkunen | G06T 7/0004 |
| 2019/0353590 A1 | 11/2019 | Ribes Cortes et al. | |
| 2023/0105753 A1 | 4/2023 | Zeh | |
| 2023/0206637 A1 | 6/2023 | Zeh | |

FOREIGN PATENT DOCUMENTS

| | | |
|---|---|---|
| CN | 108898597 A | 11/2018 |
| DE | 3737631 C1 | 3/1989 |
| DE | 10 2008 018586 A1 | 11/2009 |
| DE | 10 2014 018940 A1 | 6/2016 |
| DE | 10 2016 011497 B4 | 3/2018 |
| DE | 10 2017 000296 B4 | 7/2018 |
| EP | 1381035 A2 | 1/2004 |
| WO | 2012/087754 A1 | 6/2012 |
| WO | 2017/089736 A1 | 6/2017 |
| WO | 2017/198950 A1 | 11/2017 |
| WO | 2018/130693 A1 | 7/2018 |
| WO | 2018/212809 A1 | 11/2018 |
| WO | 2021/191708 A1 | 9/2021 |
| WO | 2021/191709 A1 | 9/2021 |

OTHER PUBLICATIONS

International Search Report and Written Opinion issued for PCT/IB2021/051754, dated May 7, 2021.
International Search Report and Written Opinion issued for PCT/IB2021/051755, dated May 7, 2021.
Labati, Two-view contactless fingerprint acquisition system: A case study for clay artworks, Biometric measurements and systems for security and medical applications, Sep. 14, 2012, IEEE Workshop, pp. 1-8.
For U.S. Appl. No. 17/913,514: Office Action dated May 20, 2024.
Office Action for EP 21 711 040.2—dated May 6, 2024.
Office Action for EP 21 710 597.2 dated May 8, 2024.
Office Action for EP 21 710 598.0 dated May 6, 2024.

* cited by examiner

METHOD FOR ASSESSING CONTRASTS ON SURFACES

FIELD OF INVENTION

The invention relates to a method for assessing contrasts on surfaces, in particular, for optically identifying structured and/or pictorial surfaces, for example, of paintings or sculptures.

BACKGROUND

In DE 102014018940 A1, a method for assessing paint or varnish surfaces using a lamp is disclosed. The lamp, an LED or halogen lamp, should be able to produce a light spectrum that is similar to daylight and can be controlled or regulated. In particular, it should be possible to switch between daylight and the more suitable colour spectrum for assessing the surface.

A stationary optical scanning device for flat surfaces is disclosed in the DE 3737631 C1. It comprises a laser light source, a light deflection device impinged by the laser light beam, an imaging element, an imaging retroreflector and a light receiving device. It is used for detecting errors on reflective surfaces, wherein fluttering of the surface should not impair measurements.

A further stationary optical device for assessing the surfaces of a component is described in DE 102008018586 A1. Two light sources and a camera device are provided, wherein the camera receives the light beams of the light sources reflected on the surfaces of the component to generate an image of the surfaces.

A similar optical analysis device for detecting the characteristics of rectangular semiconductors is shown by DE 102016011497 B4.

An optical scanning device for recording and reproducing information using light beams with at least three wavelengths, an optical pickup device, is shown by EP 1381035 B1.

A stationary measuring system for surface assessment and hyperspectral imaging is described in DE 102017000296 A1. A illumination pattern of a first measuring light with a plurality of wavelengths is generated and the illumination pattern is imaged on the surface to be examined so that it can be sharply imaged by a chromatic lens at different distances. The intensity distribution of the split first measuring light is detected by means of a detector and topographical characteristics of the surface to be examined are determined from this. The surface is also homogeneously illuminated with a second measuring light. A multifocal chromatically encoded 3D measurement method is combined with a non-confocal second measuring light. The structure and composition of the surfaces should be quickly and accurately determinable.

In WO 2017089736 A1 and the WO 2017198950 A1 methods for authentication or extended authentication of objects are disclosed.

SUMMARY

One object of the invention is to develop a method for assessing contrasts on surfaces that is simple to use independently of location and safe.

The solution to this task entails the method as disclosed herein. The method according to the invention comprises the steps:
Focusing a camera on a prominent image dot of the surface to be assessed Creation of at least two images of a recognizable, high-contrast area of the image dot
Storage of the image with the highest level of detail as a reference image.

Preferred embodiments of the invention are disclosed in the dependent claims.

The method according to the invention enables an automatic creation of sharp and high-quality images of a surface from a specified distance by means of a terminal device, preferably a mobile device (mobile device), which is equipped with a camera.

The invention is described in more detail below in an exemplary embodiment based on a drawing. dr

BRIEF DESCRIPTION OF THE DRAWINGS

The figures show.

DETAILED DESCRIPTION

Figure 1:
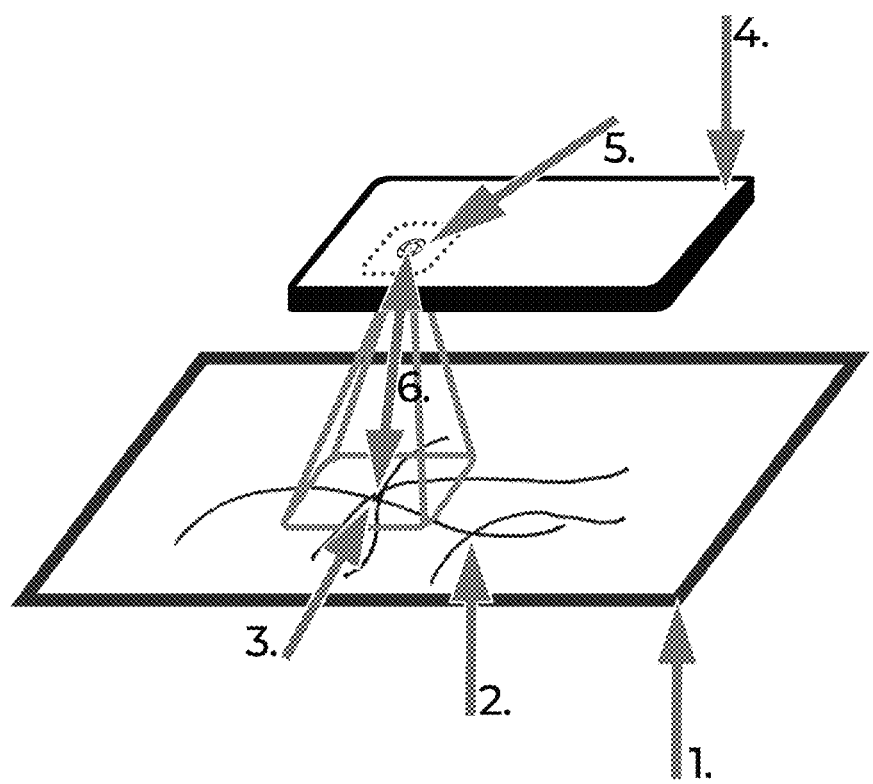
FIG. 1: an arrangement of a camera according to the invention over the surface to be detected.

A surface to be assessed 2, in the example of a painting 1, is first aligned horizontally or vertically (FIG. 1) and illuminated in an optimal and shadow-free manner by means of daylight and/or artificial light.

Subsequently, the auto-focusing of a camera 5 of a mobile device 4, for example, a tablet or a smartphone, is activated and the mobile device is aligned at a distance of, for example, of 9-10 cm approximately parallel (horizontally or vertically) with relation to the surface 2 above a prominent image dot (direction 6).

The camera 5 is focused if, for example, there is no re-focusing of the lens of the camera 5 within about 0.5 seconds. For this purpose, the physical position of the moveable lens of the lens is continuously monitored. The position of the moveable lens determines the focal length to the focal point of the optical system. As far as the average of the obtained lens positions of the lens of the camera 5 from the last approx. 0.5 seconds corresponds to the next obtained lens position, the camera 5 is classified and triggered as focused by the software of the mobile device 4.

By means of the last determined physical lens position, the actual distance to the focused object (image dot 3 of the surface 2) can be calculated by the aforementioned software, provided that the camera 5 is already measured.

Based on the measured reference distances and the corresponding lens positions, the control electronics of the mobile device 4 calculate the current distance to the focused object. If the distance corresponds to a defined specification, for example, five to eight, in the example preferably five, but at least two consecutive images/photographs of an area to be recognized are automatically created. In each image, high-contrast image dots 3 are identified. Colours, contrasts, distances and/or depths of structures are automatically determined.

These image dots 3 are surrounded by significantly stronger or weaker intense image dots. The distance 6 to the surface, for example, is 9-10 cm.

Geometric shapes are then projected on the basis of the identified high-contrast image dots 3. These image dots 3 form the corners of the projected geometric figures. The number, positions, and sizes of the geometric figures are stored in a data set for each image. The number of projected geometric figures indicates the level of detail of an image.

The image with the highest level of detail, i.e., the largest number of details, is selected for further processing (comparison of the recorded image data with previously created images) and stored as a reference (target image).

If the surface to be assessed mirrors 2 and/or is located behind a reflective, transparent cover, the mobile device 4 can be provided with a reversible glare protection 7. This glare protection 7 is, in the example, a flat square frame with a cut-out 8 for the camera 5.

Figure 2:
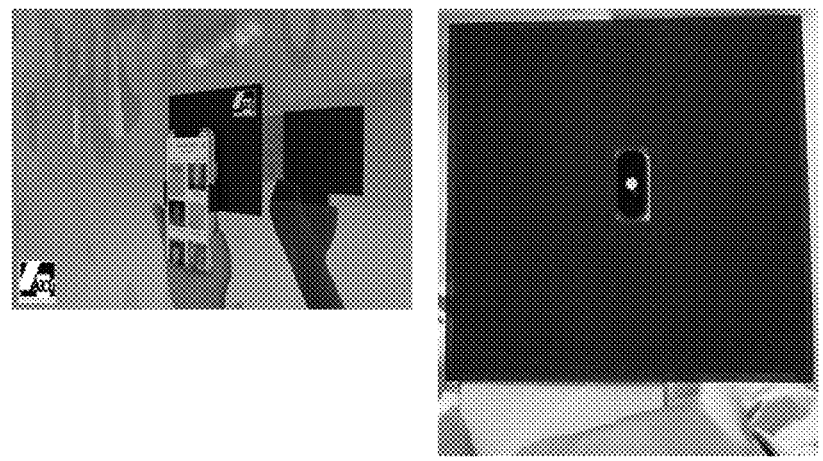
FIG. 2: the camera according to FIG. 1 with glare protection.
Figure 2:
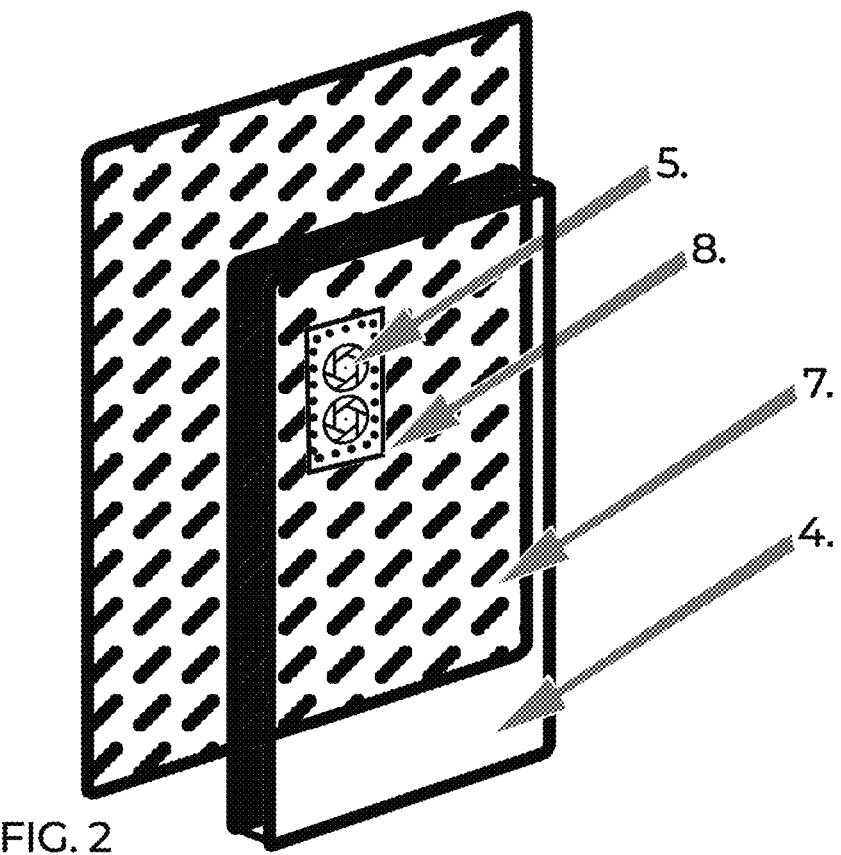

The glare protection 7 can, for example, be magnetically mounted and positioned on the mobile device 4 by means of a guide rail or click connection (FIG. 2).

In order to assess a surface for the first time, the aforementioned software/app must be installed on the mobile device 4 and this must be registered and authenticated.

Registration Procedure:
1. Collection of the personal data of the owner of the object to be recorded (artwork)
2. Acquisition of the key data of the object, such as name, creator, year of creation, dimensions, e.g., in centimetres
3. Photography of the front side of the entire object
4. Optional photography of the back side/remaining sides of the object
5. Selection of an area on the object that is to be used as a recognizable area (and/or fingerprint)
6. Capture of the surface of the object using mobile device 4 according to the aforementioned description (creation of an image with the highest level of detail of the selected area).
7. In order to further increase the quality of the selected reference image (target image), a live video stream can optionally be created with the same camera 5 and, if necessary, further individual images of the selected area are created
8. The ultimately best image from steps 5-7 is saved
9. To ensure that the stored image is suitable as a reference for a fingerprint, another image of the selected area is created according to the above description and stored as a secondary reference image.
10. The reference image from step 8, as well as the secondary reference image from step 9, will be used for future comparisons of the selected area.

Authentication Process:

The user wants to determine whether a work of art/object in his possession corresponds to the object originally recorded during the registration process or is identical to it.
1. The user selects the artwork/object to be authenticated from his collection
2. The reference image from step 8 of the registration process is now used to create the best possible image of the same area (image dot 3) from a distance 6 of, for example, 9-10 cm according to steps 6 and/or 7 of the registration
3. 
4. The best image from step 2 is saved as an authentication image for further processing
5. The stored authentication image is now compared with the reference image from the registration process by the control electronics/app of the mobile device 4 and/or with the help of a computer system
6. On the basis of matches between the authentication image and the reference image, the user receives a statement as to whether the artwork/object is the same or whether it is not the artwork/object originally recorded during the registration process.

LIST OF REFERENCE NUMBERS 1 painting
2 surface
3 image dot
4 mobile device
5 camera
6 direction
7 glare protection
8 cut-out

The invention claimed is:

1. A method for assessing contrast on surfaces, the method comprising: focusing a camera on an image dot of a surface; after focusing the camera, creating at least two images of a recognizable, high contrast area of the image dot; determining a number of details in each of the at least two images, and storing the image with the highest number of details as a reference image; after focusing the camera, calculating an actual distance to the image dot of the surface based on a physical lens position of the camera.

2. The method according to claim 1, wherein creating at least two images comprises creating five to eight images.

3. The method according to claim 1, wherein when focusing the camera on the image dot of the surface, a distance of the camera from the surface is 9-10 cm.

4. The method according to claim 2, wherein when focusing the camera on the image dot of the surface, a distance of the camera from the surface is 9-10 cm.

5. The method according to claim 1, wherein the method further comprises comparing the reference image with a photograph of the image dot of the surface created at a later time.

6. The method according to claim 2, wherein the method further comprises comparing the reference image with a photograph of the image dot of the surface created at a later time.

7. The method according to claim 3, wherein the method further comprises comparing the reference image with a photograph of the image dot of the surface created at a later time.

8. The method according to claim 4, wherein the method further comprises comparing the reference image is compared with a photograph of the image dot of the surface created at a later time.

9. The method according to claim 1, wherein the method further comprises:
after storing the image as the reference image, creating another image of the recognizable, high-contrast area of the image dot, and storing this other image as a secondary reference image.

10. The method according to claim 1, wherein the method further comprises:
after storing the image as the reference image, creating another image of the recognizable, high-contrast area of the image dot, and storing this other image as an authentication image; and
performing a comparison of the authentication image and the reference image based on matches between the authentication image and the reference image.

11. A method for assessing contrasts on surfaces, the method comprising: focusing a single camera on an image dot of a surface; after focusing the single camera, using the single camera to create at least two images of a recognizable, high contrast area of the image dot; determining a number of details in each of the at least two images; and storing the image with the highest number of details as a reference image; after focusing the camera, calculating an actual distance to the image dot of the surface based on a physical lens position of the camera.

* * * * *